United States Patent
Hansalia (10) Patent No.: US 7,774,628 B2
(45) Date of Patent: Aug. 10, 2010

(54) ENABLING/DISABLING POWER-OVER-ETHERNET SOFTWARE SUBSYSTEM IN RESPONSE TO POWER SUPPLY STATUS

(75) Inventor: Rakesh Hansalia, Milpitas, CA (US)

(73) Assignee: Foundry Networks, Inc., San Jose, CA (US)

( * ) Notice: Subject to any disclaimer, the term of this patent is extended or adjusted under 35 U.S.C. 154(b) by 759 days.

(21) Appl. No.: 11/420,458

(22) Filed: May 25, 2006

(65) Prior Publication Data

US 2007/0274322 A1    Nov. 29, 2007

(51) Int. Cl.
G06F 1/32       (2006.01)
(52) U.S. Cl. .................................. 713/320; 713/300
(58) Field of Classification Search .......... 713/300, 713/320
See application file for complete search history.

(56) References Cited

U.S. PATENT DOCUMENTS

| | | | |
|---|---|---|---|
| 5,406,260 A | 4/1995 | Cummings et al. | |
| 5,828,558 A | 10/1998 | Korcharz et al. | |
| 6,049,471 A | 4/2000 | Korcharz et al. | |
| 6,218,930 B1 | 4/2001 | Katzenberg et al. | |
| 6,473,608 B1 | 10/2002 | Lehr et al. | |
| 6,643,566 B1 | 11/2003 | Lehr et al. | |
| 6,839,215 B2 | 1/2005 | Le Creff et al. | |
| 6,841,979 B2 | 1/2005 | Berson et al. | |
| 6,973,394 B2 | 12/2005 | Jaeger et al. | |
| 6,985,713 B2 | 1/2006 | Lehr et al. | |
| 6,986,071 B2 | 1/2006 | Darshan et al. | |
| 6,992,599 B2 | 1/2006 | Vergnaud et al. | |
| 6,996,458 B2 | 2/2006 | Pincu et al. | |
| 7,006,815 B2 | 2/2006 | Lehr et al. | |
| 7,040,926 B2 | 5/2006 | Ferentz | |
| 7,046,983 B2 | 5/2006 | Elkayam et al. | |
| 7,068,781 B2 | 6/2006 | Le Creff et al. | |
| 7,117,272 B2 | 10/2006 | Rimboim et al. | |
| 7,142,951 B2 | 11/2006 | Pincu et al. | |
| 7,145,439 B2 | 12/2006 | Darshan et al. | |
| 7,146,258 B2 | 12/2006 | Pincu et al. | |
| 7,154,381 B2 * | 12/2006 | Lang et al. | 340/310.11 |
| 7,155,622 B2 * | 12/2006 | Mancey et al. | 713/324 |
| 7,159,129 B2 | 1/2007 | Pincu et al. | |
| 7,170,194 B2 | 1/2007 | Korcharz et al. | |
| 7,203,849 B2 * | 4/2007 | Dove | 713/300 |
| 7,272,669 B2 * | 9/2007 | Mattur et al. | 710/16 |
| 7,337,336 B2 * | 2/2008 | Ferentz et al. | 713/300 |
| 7,340,620 B2 * | 3/2008 | Dove | 713/300 |
| 7,373,528 B2 * | 5/2008 | Schindler | 713/300 |

(Continued)

Primary Examiner—Chun Cao
(74) Attorney, Agent, or Firm—Bever, Hoffman & Harms, LLP; E. Eric Hoffman (57) ABSTRACT

An Ethernet switch includes 12-Volt and 48-Volt power sourcing modules, system software, Ethernet interface modules and optional power over Ethernet (PoE) modules. The Ethernet interface modules are motherboards that include the circuitry required to implement a non-PoE system. The PoE modules are daughter boards that include the circuitry required to supply powered devices in a PoE subsystem. A PoE module may be connected to a corresponding Ethernet interface module. During start up, all of the Ethernet interface modules are first powered up in response to the 12-Volt power sourcing module. If the system software subsequently determines that the 48-Volt power sourcing module is operational, then (and only then) the system software attempts to detect the presence of any PoE modules. Upon detecting one or more PoE modules, the PoE modules are initialized and configured, thereby enabling PoE operation.

28 Claims, 3 Drawing Sheets

U.S. PATENT DOCUMENTS

| | | |
|---|---|---|
| 2003/0146765 A1 | 8/2003 | Darshan et al. |
| 2003/0194912 A1 | 10/2003 | Ferentz |
| 2004/0236967 A1 | 11/2004 | Korcharz et al. |
| 2005/0243861 A1* | 11/2005 | Elkayam et al. ............ 370/466 |
| 2006/0109728 A1 | 5/2006 | Dwelley et al. |
| 2006/0112285 A1 | 5/2006 | Stineman, Jr. |
| 2006/0149978 A1* | 7/2006 | Randall et al. ............. 713/300 |
| 2006/0164062 A1 | 7/2006 | Stineman, Jr. et al. |
| 2006/0164098 A1 | 7/2006 | Su |
| 2006/0164108 A1 | 7/2006 | Herbold |
| 2006/0164769 A1 | 7/2006 | Stanford et al. |
| 2006/0164773 A1 | 7/2006 | Stanford et al. |
| 2006/0164774 A1 | 7/2006 | Herbold et al. |
| 2006/0164775 A1 | 7/2006 | Stineman, Jr. et al. |
| 2006/0165096 A1 | 7/2006 | Heath et al. |
| 2006/0166706 A1 | 7/2006 | Dwelley et al. |
| 2006/0168458 A1 | 7/2006 | Stineman, Jr. et al. |
| 2006/0210057 A1 | 9/2006 | Stanford |
| 2007/0021094 A1 | 1/2007 | Elkayam et al. |

* cited by examiner

ENABLING/DISABLING POWER-OVER-ETHERNET SOFTWARE SUBSYSTEM IN RESPONSE TO POWER SUPPLY STATUS

FIELD OF THE INVENTION

The present invention relates to a power over Ethernet (PoE) system. More specifically, the present invention relates a method for enabling and disabling a PoE software subsystem in response to the status of an associated power supply.

RELATED ART

In a power over Ethernet (PoE) system, one or more Ethernet devices connected to an Ethernet network are powered over the network cables. Power sourcing equipment located in an Ethernet switch is used to supply the power on the network cables. Ethernet devices which are configured to operate in response to the power supplied on the network cables are commonly referred to as powered Ethernet devices, or simply powered devices (PDs). As defined herein, Ethernet devices which are configured to receive power from a separate power supply (e.g., a conventional 120 Volt AC outlet) will be referred to as non-PoE devices.

Figure 1:
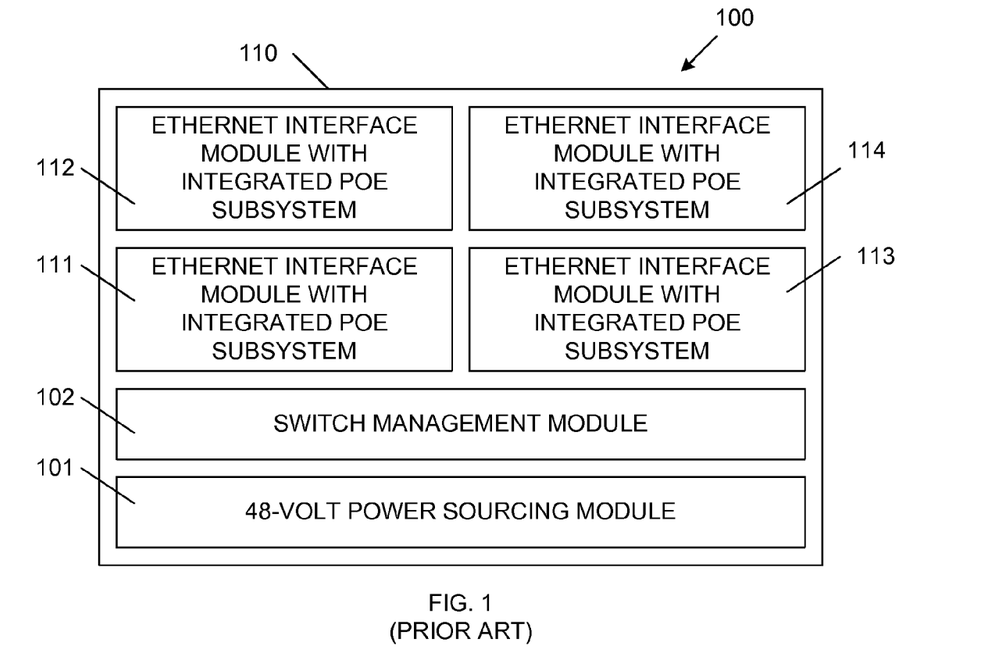
FIG. 1 is a block diagram of a conventional Ethernet switch, which includes Ethernet interface modules with integrated PoE subsystems.

FIG. 1 is a block diagram of a conventional Ethernet switch 100, which is capable of operating in a PoE system. Ethernet switch 100 includes power sourcing module 101, switch management module 102, backplane 110 and Ethernet interface modules 111-114. As described in more detail below, each of Ethernet interface modules 111-114 includes an integrated PoE subsystem. Backplane 110 provides the desired electrical connections between the various modules 101-102 and 111-114. Backplane 110 typically includes female connector elements for receiving corresponding male connector elements on modules 101-102 and 111-114. Backplane 110 further includes electrical conductors and devices which facilitate signal and power transfer between modules 101-102 and 111-114. Backplane 110 is typically supported by a rack (not shown), which includes a plurality of slots that are sized and positioned to receive and hold modules 101-102 and 111-114.

Power sourcing module 101 is designed to supply a known voltage, typically 48 Volts. A 48-Volt power supply is selected because any powered device coupled to Ethernet interface modules 111-114 must be supplied from a 48-Volt source. Thus, switch management module 102 and Ethernet interface modules 111-114 are configured to operate in response to the 48-Volt power sourcing module 101.

However, switch management module 102 and Ethernet interface modules 111-114 include internal digital circuitry that must be operated in response to a 12-Volt source. Switch management module 102 and Ethernet interface modules 111-114 must therefore include 48-Volt to 12-Volt step down circuitry.

Figure 2:
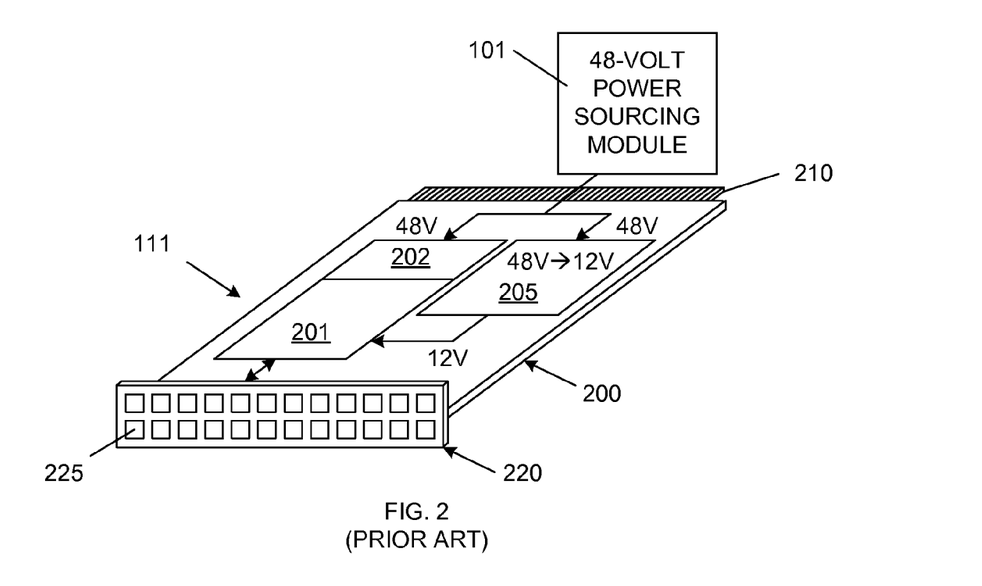
FIG. 2 is a schematic diagram of an Ethernet interface module of FIG. 1.

FIG. 2 is a schematic diagram of Ethernet interface module 111 (which is identical to Ethernet interface modules 112-114). Ethernet interface module 111 is a motherboard that includes printed circuit board 200, 12-Volt internal digital system 201, 48-Volt integrated PoE subsystem 202, 48-Volt to 12-Volt step down converter 205, male connector element 210, and Ethernet port access panel 220. Male connector element 210 is inserted into a corresponding female connector element on backplane 110, thereby coupling Ethernet interface module 111 to 48-Volt power sourcing module 101. The printed circuit board 200 routes the 48-Volt supply voltage to integrated PoE subsystem 202 and step down converter 205. Step down converter 205 provides a 12-Volt output signal in response to the 48-Volt supply voltage. This 12-Volt output signal is used to power internal digital system 201.

Both internal digital system 201 and integrated PoE subsystem 202 are coupled to Ethernet port access panel 220. In the described example, Ethernet port access panel 220 has 24 Ethernet ports, including Ethernet port 225. If a powered device is coupled to Ethernet port 225, PoE subsystem 202 supplies the received 48-Volt supply voltage to Ethernet port 225 (and thereby supplies power to the powered device).

Conversely, if a non-PoE device is coupled to Ethernet port 225, the 48-Volt supply voltage received by integrated PoE subsystem 202 is not used to power Ethernet port 225. Rather, signaling on Ethernet port 225 is implemented entirely by the 12-Volt internal digital system 201.

As described above, both internal digital system 201 and integrated PoE subsystem 202 are powered by 48-Volt power sourcing module 101. Using this design, if internal digital system 201 is available for access, then integrated PoE subsystem 202 is also available for access.

However, this conventional system design is not cost-effective from a hardware perspective, because each of the Ethernet interface modules 111-114 must include a PoE subsystem, regardless of whether the end user wants or uses the PoE subsystem. Users not using the PoE subsystem will still have to pay for the presence of this subsystem indirectly.

This conventional system design also requires that Ethernet interface modules 111-114 be powered by a 48-Volt power sourcing module, even if none of the ports of Ethernet interface modules 111-114 are coupled to a powered device. Note that if there are no powered devices coupled to Ethernet interface modules 111-114, Ethernet switch could theoretically be operated in response to a 12-Volt power sourcing module. In this case, hardware inefficiencies may exist with respect to the 48-Volt power sourcing module 101 and the step down converters required on each of the Ethernet interface modules 111-114 and the switch management module 102.

It would therefore be desirable to have an improved apparatus and method for implementing an Ethernet switch using Ethernet interface modules, which remedies the above-described deficiencies of the prior art.

SUMMARY

Accordingly, the present invention provides an improved method for implementing a PoE subsystem in an Ethernet interface module. More specifically, the present invention provides an Ethernet interface module motherboard that does not include an integrated PoE subsystem, but rather, includes a connection structure configured to receive a separate PoE module daughter card, which includes a PoE subsystem. Thus, the user can decide whether each Ethernet interface module includes a PoE subsystem by attaching (or not attaching) a corresponding PoE module to the Ethernet interface module.

During the initial start up phase of the Ethernet switch, all of the Ethernet interface modules are powered up and initialized in response to a 12-Volt supply voltage provided by a 12-Volt power sourcing module. Advantageously, the Ethernet interface modules do not require 48-Volt to 12-Volt converters. The system software does not attempt to detect or enable any PoE modules until after the initial start up phase is complete.

After the Ethernet interface modules have been powered up and initialized in response to the 12-Volt supply voltage, the system software determines whether an operational 48-Volt power sourcing module is enabled within the Ethernet switch. If the system software detects the presence of an operational 48-Volt power sourcing module, then (and only then) the system software attempts to detect the presence of any PoE modules that may be connected to the Ethernet interface modules. PoE modules can only be detected when these modules are receiving power from the 48-Volt power sourcing module.

Note that when the first 48-Volt power sourcing module becomes operational in the system, all PoE modules in the system automatically receive low voltage power required for digital circuit operation. That is, the received 48-Volt supply voltage is down-converted within the PoE modules to enable digital circuit operation within the modules. However, the system software must be informed that these PoE modules exist and are now receiving the low voltage power. The system software relies on the first 48-Volt power sourcing module becoming operational as the event that triggers the search for the PoE modules and making these PoE modules fully operational.

The present invention will be more fully understood in view of the following description and drawings.

DETAILED DESCRIPTION

Figure 3:
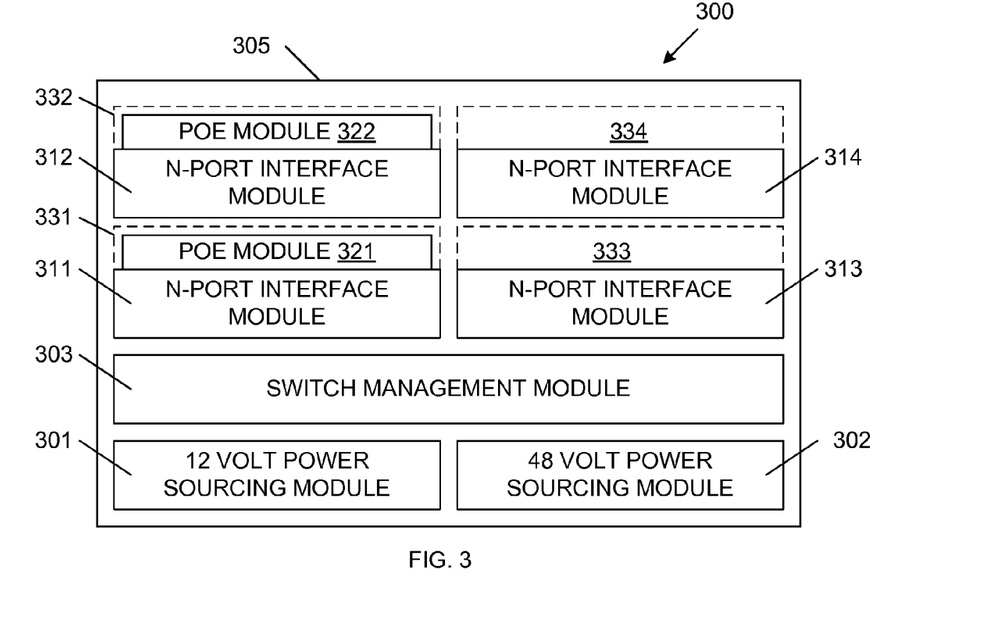
FIG. 3 is a block diagram of an Ethernet switch in accordance with one embodiment of the present invention.

FIG. 3 is a block diagram of an Ethernet switch 300, which is capable of operating in a PoE system in accordance with one embodiment of the present invention. Ethernet switch 300 includes 12-Volt power sourcing module 301, 48-Volt power sourcing module 302, switch management module 303, backplane 305, Ethernet interface modules 311-314 and PoE modules 321-322. As described in more detail below, Ethernet interface modules 311-314 do not include integrated PoE subsystems. Backplane 305 operates in the same manner as backplane 110 (FIG. 1) to provide the desired electrical connections between modules 301-303 and 311-314. Thus, backplane 305 is supported by a rack (not shown), which in turn, helps to support modules 301-303 and 311-314.

Power sourcing modules 301 and 302 are designed to supply voltages of 12-Volts and 48-Volts, respectively. As described in more detail below, 48-Volt power sourcing module is only necessary if one or more of the Ethernet interface modules 311-314 is connected to a corresponding PoE module. Switch management module 303 and the internal digital system present on each of the Ethernet interface modules 311-314 are configured to operate in response to the 12-Volt power sourcing module 301. 48-Volt to 12-Volt step down circuitry is therefore not necessary in switch management module 303 or Ethernet interface modules 311-314.

Figure 4:
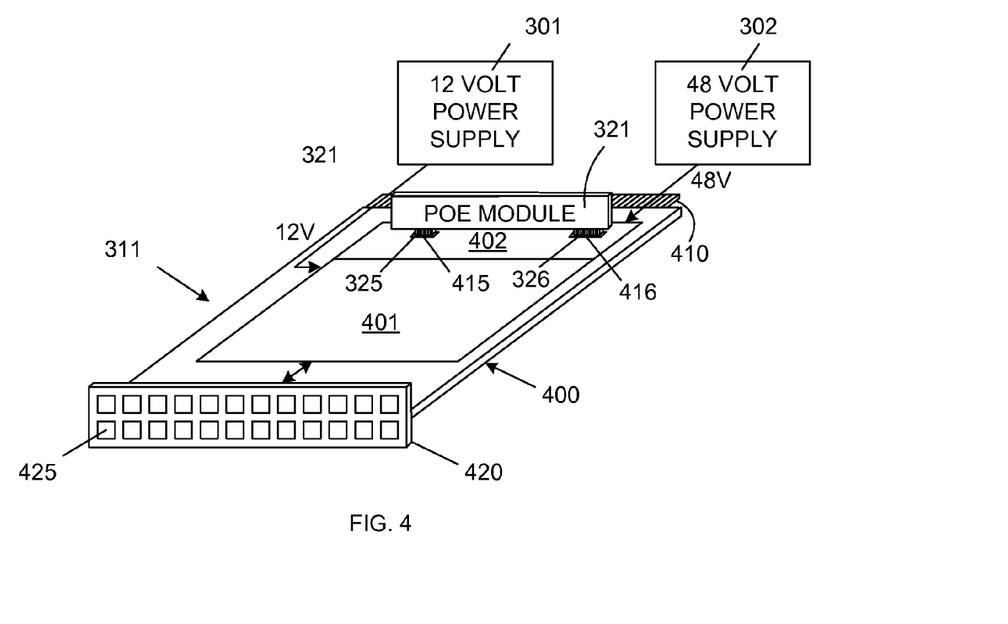
FIG. 4 is a schematic diagram of an Ethernet interface module and an associated PoE module in accordance with one embodiment of the present invention.

Both internal digital system 401 and PoE module 321 are coupled to Ethernet port access panel 420. In the described example, Ethernet port access panel 420 has 24 Ethernet ports, including Ethernet port 425. If a powered device is coupled to Ethernet port 425, PoE module 321 supplies the received 48-Volt supply voltage to Ethernet port 425 (and thereby supplies power to the powered device). Conversely, if a non-PoE device is coupled to Ethernet port 425, the 48-Volt supply voltage received by PoE module 321 is not used to power Ethernet port 425. Rather, signaling on Ethernet port 425 is implemented entirely by the 12-Volt internal digital system 401.

FIG. 4 is a schematic diagram of Ethernet interface module 311 (which is identical to Ethernet interface modules 312-314). Ethernet interface module 311 is a motherboard that includes printed circuit board 400, 12-Volt internal digital system 401, male connector element 410, female connector elements 415-416 and Ethernet port access panel 420. Male connector element 410 is inserted into a corresponding female connector element on backplane 305, thereby coupling Ethernet interface module 311 to both 12-Volt power sourcing module 301 and 48-Volt power sourcing module 302 (if present). The 12-Volt output signal provided by power sourcing module 301 is used to power internal digital system 401.

Female connector elements 415-416 of motherboard 400 are configured to receive corresponding male connector elements 325 and 326 present on PoE module 321, thereby placing PoE module 321 into electrical contact with Ethernet interface module 311. PoE module 321 is an optional daughter card, which is connected to motherboard 400 to enable Ethernet interface module 311 to support powered devices connected to Ethernet port access panel 420.

In the described example, Ethernet interface modules 311 and 312 are coupled to corresponding PoE modules 321 and 322, while Ethernet interface modules 313 and 314 are not coupled to corresponding PoE modules. However, it is understood that any, all or none of the Ethernet interface modules 311-314 can be coupled to corresponding PoE modules in other embodiments.

Ethernet switch 300 operates as follows in accordance with one embodiment of the present invention. Ethernet switch 300 is initially booted up and initialized when 12-Volt power sourcing module 301 is present and enabled. During the initialization process, system software (which is implemented by switch management module 303) does not attempt to recognize any PoE modules present in Ethernet switch 300. That is, the initialization process proceeds as if there are no PoE modules present in Ethernet switch 300. At this time, each of the Ethernet interface modules 311-314 (including each associated internal digital system) is initialized by the system software, wherein Ethernet switch 300 operates entirely in response to 12-Volt power supplied by the 12-Volt power sourcing module 301. The 48-Volt power sourcing module 302 need not be enabled during this portion of the initialization phase.

A portion of the system software is responsible for detecting the presence and health of the power sourcing modules within Ethernet switch 300. After Ethernet switch 300 is operating in response to 12-Volt power sourcing module 301, the system software will generate an event upon detecting the presence and good health of the first 48-Volt power supply detected in Ethernet switch 300 (e.g., 48-Volt power sourcing module 302). The PoE modules are powered up in response to the 48-Volt supply voltage provided by 48-Volt power sourcing module 302. Note that digital circuitry on a PoE module may be powered by a 3.3-Volt supply voltage that is created by stepping down the received 48-Volt supply voltage.

The event generated upon detecting the first 48-Volt power sourcing module is provided to PoE software, which is also implemented by switch management module 303. This event causes the PoE software to trigger the execution of an initialization code that, as part of the initialization process, attempts to detect and recognize all PoE modules present in Ethernet switch 300. Because this phase of the initialization process is not initiated until after 48-Volt power is supplied to Ethernet interface modules 311-314, PoE module detection is guaranteed to succeed if a PoE module is connected to the associated Ethernet interface module, and fail if no PoE module is connected to the associated Ethernet interface module. Any detected PoE modules are initialized and fully configured by switch management module 303, in response to corresponding user provided instructions.

It is important to generate the event indicating that a 48-Volt power supply has been detected before allowing the PoE software to search for PoE modules, because the PoE software is incapable of detecting a PoE module in the absence of a 48-Volt power supply. If the PoE software were to attempt to detect the presence of PoE modules in the absence of a 48-Volt power supply, then no PoE modules present in the Ethernet switch 300 would be detected. Moreover, the system software would be unable to subsequently detect a PoE module that is not initially detected, because of a hardware design limitation. That is, the hardware design typically does not specify an explicit event that can trigger the software to begin searching for PoE modules, other than the presence event of the first detected 48-Volt power sourcing module.

The present invention enables Ethernet interface modules (motherboards) and PoE modules (daughter cards) to be manufactured as separate entities and products. Users purchasing an Ethernet switch without the PoE feature will receive Ethernet interface modules that do not include PoE circuitry. Alternately, users purchasing an Ethernet switch with the PoE feature will receive one or more Ethernet interface modules, each having an attached corresponding PoE module. This arrangement provides the manufacturer full flexibility in manufacturing and maintaining inventory of the Ethernet interface modules and PoE modules. In addition, the users realize cost-effectiveness in purchasing Ethernet interface modules without a PoE feature. Moreover, a user will also have the ability to upgrade a non-PoE Ethernet switch to an Ethernet switch capable of supporting PoE functionality, merely by purchasing and installing a PoE module.

In accordance with another embodiment of the present invention, more than one 48-Volt power sourcing module may be included in an Ethernet switch. The additional 48-Volt power sourcing modules provide capacity to enable a larger number of powered devices to be connected to the Ethernet switch. The operation of Ethernet switch 300, with one additional 48-Volt power sourcing module, is described below.

Figure 5:
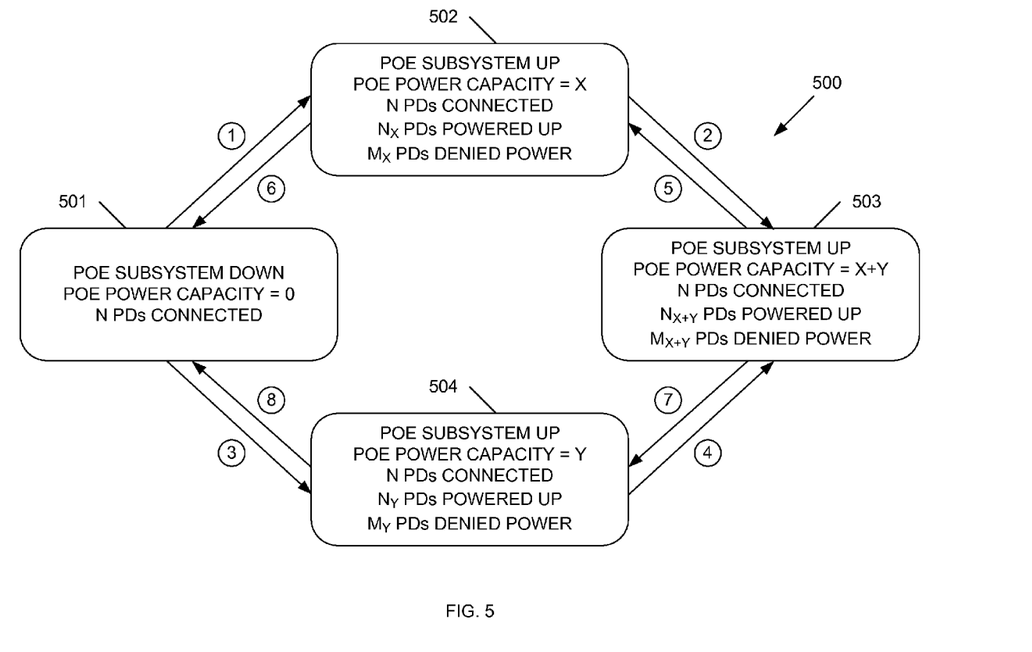
FIG. 5 is a state diagram illustrating the operation of the Ethernet switch of FIG. 3 in response to a pair of 48-Volt power sourcing modules, in accordance with one embodiment of the present invention.

FIG. 5 is a state diagram illustrating the operation of Ethernet switch 300 in response to a pair of 48-Volt power sourcing modules. In the initial state 501, the 12-Volt system is operational, but the PoE modules have not yet been enabled. That is, the system software has not yet generated an event indicating the presence of an operational 48-Volt power supply, so the power allocated to the PoE modules is set to zero. At least one of the Ethernet interface modules has an attached PoE module, and there are a total of N powered devices coupled to the ports of these Ethernet interface modules.

The system software generates event 1 upon detecting the presence of a first 48-Volt power sourcing module having a first capacity, X. The system software increases the available power capacity of the PoE subsystem to X, which triggers: (a) the initialization of the PoE modules, (b) the detection of any PoE modules in the Ethernet interface modules, and (c) the initialization of PoE drivers in each detected PoE module. The PoE subsystem uses the PoE drivers to enable Nx powered devices, thereby placing these powered devices in a powered up state. The number of powered devices in a denied power state is designated Mx, wherein Mx=N−Nx. This condition is illustrated as state 502 in FIG. 5. Note that a port will enter a 'denied power' state when there is insufficient power capacity available to meet the powering needs of the port.

Processing will return to state 501 from state 502 if the system software determines that the first 48-Volt power sourcing module has been disabled or becomes otherwise unavailable. In this transition, which is illustrated as event 6 in FIG. 5, the system software detects that the PoE power capacity has been reduced from X to zero, thereby triggering shutdown of the PoE modules wherein all allocated system resources (including PoE driver resources) are cleaned up. The PoE subsystem makes no attempts to access the PoE hardware, because all of the PoE modules have lost power.

When in state 502, the system software will generate event 2 upon detecting the presence of a second 48-Volt power sourcing module having a second capacity, Y. The system software increases the available power capacity of the PoE subsystem to X+Y, which triggers the PoE subsystem to enable Ny additional powered devices, thereby placing these additional powered devices in the powered up state. The number of powered devices in the powered up state is designated Nx+y, wherein Nx+y=Nx+Ny. The number of powered devices in the denied power state is designated Mx+y, wherein Mx+y=N−Nx+y. This condition is illustrated as state 503 in FIG. 5.

Note that processing will return to state 502 from state 503 if the second 48-Volt power sourcing module has been disabled or becomes otherwise unavailable. In this transition, which is illustrated as event 5 in FIG. 5, the system software reduces the PoE power capacity from X+Y to X, thereby triggering the PoE subsystem to disable Ny powered devices for power recovery. At this time, Nx powered devices are in the power up state and Mx powered devices are in the denied power state.

If the second 48-Volt power sourcing module is enabled before the first 48-Volt power sourcing module (from initial state 501), then the system software generates event 3 (which is similar to event 1) and proceeds to state 504 (which is similar to state 503). Processing can return to state 501 from state 504 if the second 48-Volt power sourcing module is disabled. In this case, the system software generates event 8, which is processed in a manner similar to event 6.

Processing can also proceed from state 504 to state 503 if the first 48-Volt power sourcing module is subsequently enabled. In this case, the system software generates event 4, which is processed in a manner similar to event 2. Processing can also return from state 503 to state 504 if the first 48-Volt power sourcing module is disabled. In this case, the system software generates event 7, which is processed in a manner similar to event 5.

Although the present invention has been described in connection with various embodiments, it is understood that variations of these embodiments would be obvious to one of ordinary skill in the art. Thus, the present invention is limited only by the following claims.

I claim:

1. A method of implementing an Ethernet switch, comprising:

applying a first supply voltage to one or more interface modules, wherein the first supply voltage is selected to operate digital circuitry on the one or more interface modules;

powering the one or more interface modules with the first supply voltage; then applying a second supply voltage to the one or more interface modules, wherein the second supply voltage is greater than the first supply voltage, and wherein the second supply voltage is selected to support a power over Ethernet (PoE) function;

powering one or more power over Ethernet (PoE) modules connected to the one or more interface modules with the second supply voltage;

detecting the presence of the second supply voltage within the Ethernet switch; and detecting the presence of the one or more PoE modules in response to detecting the presence of the second supply voltage within the Ethernet switch.

2. The method of claim 1, further comprising supplying the second supply voltage to one or more Ethernet ports of a first one of the interface modules, wherein the first one of the interface modules is connected to a corresponding first one of the PoE modules.

3. The method of claim 1, further comprising inserting a PoE module into a connector element in one of the interface modules.

4. The method of claim 1, wherein the step of detecting the presence of the second supply voltage within the Ethernet switch comprises generating an event with hardware within the Ethernet switch when the second supply voltage is enabled.

5. The method of claim 1, wherein the step of detecting the presence of the one or more PoE modules is performed by software within the Ethernet switch.

6. An Ethernet switch comprising:
an Ethernet interface module that includes digital circuitry;
a first power supply module configured to provide a first power supply voltage to the Ethernet interface module, thereby powering the digital circuitry of the Ethernet interface module;
a power over Ethernet (PoE) module connected to the Ethernet interface module, wherein the PoE module includes digital circuitry; and
a second power supply module configured to provide a second power supply voltage, greater than the first power supply voltage, to the PoE module, thereby powering the digital circuitry of the PoE module, wherein the second power supply voltage is selected to support one or more power over Ethernet (PoE) connections to the Ethernet interface module; and
system software configured to detect the second power supply voltage provided by the second power supply module and enable the PoE module only after the second power supply voltage is detected.

7. The Ethernet switch of claim 6, wherein the Ethernet interface module comprises a motherboard, and the PoE module comprises a daughter board connected to the motherboard.

8. The Ethernet switch of claim 6, wherein the first power supply voltage is 12 Volts, and the second power supply voltage is 48 Volts.

9. The Ethernet switch of claim 6, further comprising one or more additional Ethernet interface modules coupled to receive the first power supply voltage from the first power supply module.

10. The Ethernet switch of claim 9, further comprising one or more additional PoE modules, each connected to a corresponding one of the one or more additional Ethernet interface modules.

11. The Ethernet switch of claim 6, further comprising a switch management module that implements the system software, wherein the switch management module is powered by the first power supply module.

12. The Ethernet switch of claim 6, further comprising a rack having a slot configured to receive and hold either the Ethernet interface module alone, or the Ethernet interface module with the connected PoE module.

13. The Ethernet switch of claim 6, wherein the Ethernet interface module comprises a plurality of Ethernet ports, and wherein the PoE module routes the second power supply voltage to one or more of the Ethernet ports.

14. The Ethernet switch of claim 6, wherein the PoE module comprises a down-converter which converts the second power supply voltage to a third supply voltage, which is used to operate the digital circuitry of the PoE module.

15. A method comprising:
providing an Ethernet switch including an interface module that includes at least one power over Ethernet (PoE) port, and a PoE module that couples to the interface module and controls power to the PoE port;
applying a first voltage from a first power supply to digital circuits of the interface module;
applying a second voltage from a second power supply to digital circuits of the PoE module, the second power supply being a different power supply than the first power supply and the second voltage being greater than the first voltage; and
enabling the PoE module only after the second power supply voltage is detected.

16. The method of claim 15, further comprising inserting the PoE module into a connector element in the interface module.

17. An Ethernet switch comprising:
an interface module that includes at least one Power over Ethernet (PoE) port and a PoE module that couples to the interface module and controls power to the PoE port; and
system software that detects the PoE module only after a first voltage is provided to the interface module and a second voltage, different than the first voltage, is provided to the PoE module.

18. The Ethernet switch of claim 17, wherein the interface module comprises a motherboard, and the PoE module comprises a daughter board connected to the motherboard.

19. The Ethernet switch of claim 17, further comprising a switch management module that implements the system software, wherein the switch management module is powered by the first power supply voltage.

20. The Ethernet switch of claim 17, wherein the PoE module comprises a voltage converter which converts the second power supply voltage to a third supply voltage, which is used to operate the digital circuitry of the PoE module.

21. A method of implementing an Ethernet switch, comprising:
applying a first supply voltage to an interface module, wherein the interface module initially operates entirely in response to the first supply voltage; then
detecting the presence of a second supply voltage within the Ethernet switch, wherein the second supply voltage powers a power over Ethernet (PoE) module connected to the interface module; and then
detecting the presence of the PoE module.

22. The method of claim 21, wherein the second supply voltage is greater than the first supply voltage.

23. The method of claim 21, further comprising supplying the second supply voltage from the PoE module to an Ethernet port of the interface module.

24. The method of claim 21, further comprising inserting the PoE module into a connector element of the interface module.

25. A method of implementing an Ethernet switch, comprising:

generating a first event with system software within the Ethernet switch in response to detecting the presence of a supply voltage within the Ethernet switch, wherein the supply voltage powers a power over Ethernet (PoE) module within the Ethernet switch; and enabling PoE software within the Ethernet switch to execute an initialization code in response to the first event, wherein the initialization code detects the PoE module within the Ethernet switch.

26. The method of claim 25, further comprising configuring the PoE module in response to detecting the PoE module.

27. The method of claim 26, wherein the step of configuring the PoE module comprises initializing PoE drivers in the PoE module.

28. The method of claim 26, further comprising:

generating a second event with the system software in response to detecting the supply voltage has become unavailable; and triggering shutdown of the PoE module in response to the second event.

* * * * *

UNITED STATES PATENT AND TRADEMARK OFFICE
CERTIFICATE OF CORRECTION

| | | |
|---|---|---|
| PATENT NO. | : 7,774,628 B2 | |
| APPLICATION NO. | : 11/420458 | |
| DATED | : August 10, 2010 | |
| INVENTOR(S) | : Rakesh Hansalia | |

It is certified that error appears in the above-identified patent and that said Letters Patent is hereby corrected as shown below:

<u>Column 8</u>
Line 53, delete "power supply".
Line 56, delete "power supply".
Line 56, delete "supply" (second occurrence).
Line 57, delete "the" (first occurrence).

Signed and Sealed this
Thirty-first Day of January, 2012

David J. Kappos
*Director of the United States Patent and Trademark Office*